United States Patent
Chabinsky et al.

(10) Patent No.: US 9,020,343 B1
(45) Date of Patent: Apr. 28, 2015

(54) PRE-JAM WAVEFORMS FOR ENHANCED OPTICAL BREAK LOCK JAMMING EFFECTS

(75) Inventors: Jordan Chabinsky, Nashua, NH (US); Jeffrey Jew, Brookline, NH (US); Philip Soletsky, Brookline, NH (US); David E. Lindenbaum, Cambridge, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 243 days.

(21) Appl. No.: 13/460,119

(22) Filed: Apr. 30, 2012
(Under 37 CFR 1.47)

Related U.S. Application Data

(60) Provisional application No. 61/480,895, filed on Apr. 29, 2011.

(51) Int. Cl.
  *H04K 3/00* (2006.01)
  *G01S 7/42* (2006.01)
  *G01S 7/38* (2006.01)

(52) U.S. Cl.
  CPC .... *H04K 3/00* (2013.01); *G01S 7/38* (2013.01)

(58) Field of Classification Search
  CPC .................................. H04K 3/00; G01S 7/38
  USPC ........................................ 398/39; 342/13, 14
  See application file for complete search history.

(56) References Cited

U.S. PATENT DOCUMENTS

| | | | |
|---|---|---|---|
| 6,359,710 B1 * | 3/2002 | Takken et al. | 398/178 |
| 6,429,446 B1 * | 8/2002 | Labaugh | 250/504 R |
| 6,933,877 B1 * | 8/2005 | Halladay et al. | 342/14 |
| 7,212,148 B1 * | 5/2007 | Torres | 342/13 |
| 7,425,916 B2 | 9/2008 | Stevens, Jr. | |
| 7,688,247 B2 * | 3/2010 | Anschel et al. | 342/14 |
| 7,925,159 B2 | 4/2011 | Dove | |
| 7,982,654 B2 * | 7/2011 | Low | 342/15 |
| 8,068,214 B1 * | 11/2011 | Bhargava et al. | 356/4.01 |
| 8,094,702 B2 * | 1/2012 | Simic et al. | 375/150 |
| 8,212,709 B2 * | 7/2012 | Bradley | 342/14 |
| 8,212,996 B2 * | 7/2012 | Bhargava et al. | 356/4.01 |
| 8,258,994 B2 | 9/2012 | Hamilton | |
| 8,886,038 B1 * | 11/2014 | Chabinsky et al. | 398/39 |
| 2006/0164283 A1 * | 7/2006 | Karlsson | 342/14 |
| 2008/0111728 A1 * | 5/2008 | Stevens | 342/14 |
| 2008/0174469 A1 * | 7/2008 | Stark et al. | 342/14 |

(Continued)

FOREIGN PATENT DOCUMENTS

| | | |
|---|---|---|
| EP | 2079150 A1 * | 7/2009 |
| WO | WO 9965173 A1 * | 12/1999 |
| WO | WO2013072493 A1 * | 5/2013 |

OTHER PUBLICATIONS

United States Official Action dated Feb. 6, 2014 received in related U.S. Appl. No. 13/460,130.

*Primary Examiner* — Ken Vanderpuye
*Assistant Examiner* — Amritbir Sandhu
(74) *Attorney, Agent, or Firm* — Scully, Scott, Murphy & Presser, P.C.; Paul J. Esatto

(57) ABSTRACT

Various embodiments of the present invention relate to pre-jam waveforms for enhanced optical break lock jamming effects. In various examples, pre-jam waveforms for enhanced optical break lock jamming effects may be implemented in the context of systems, methods, computer program products and/or algorithms.

26 Claims, 6 Drawing Sheets

(56) References Cited

U.S. PATENT DOCUMENTS

| | | | |
|---|---|---|---|
| 2008/0198060 A1* | 8/2008 | Shani et al. | 342/14 |
| 2008/0297394 A1* | 12/2008 | Dark et al. | 342/13 |
| 2009/0237289 A1* | 9/2009 | Stoddard | 342/14 |
| 2010/0126335 A1* | 5/2010 | Saban et al. | 89/36.01 |
| 2012/0033084 A1* | 2/2012 | Bhargava et al. | 348/164 |
| 2012/0051239 A1* | 3/2012 | Thai | 370/252 |
| 2012/0119933 A1* | 5/2012 | Manela et al. | 342/14 |
| 2012/0213513 A1* | 8/2012 | Chao | 398/39 |
| 2013/0178148 A1* | 7/2013 | Delaveau et al. | 455/1 |
| 2013/0328711 A1* | 12/2013 | Fenton | 342/16 |
| 2014/0159934 A1* | 6/2014 | Rudnisky et al. | 342/14 |

* cited by examiner

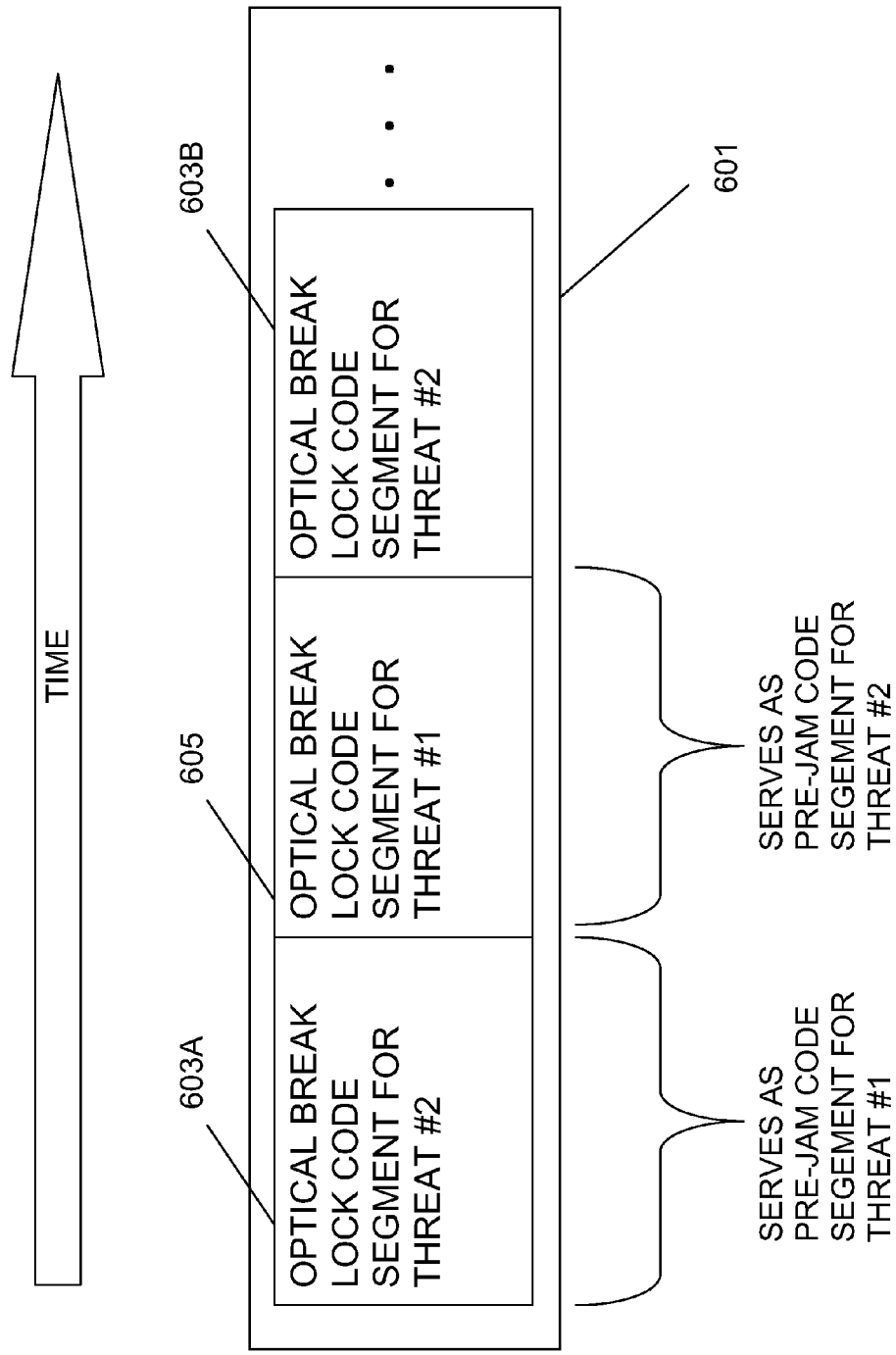

PRE-JAM WAVEFORMS FOR ENHANCED OPTICAL BREAK LOCK JAMMING EFFECTS

CROSS-REFERENCE TO RELATED APPLICATIONS

This application claims the benefit under 35 U.S.C. §119 (e) of U.S. Provisional Application Ser. No. 61/480,895, filed Apr. 29, 2011. The entire contents and disclosure of the aforementioned provisional application is incorporated by reference as if fully set forth herein.

BACKGROUND OF THE INVENTION

1. Field of the Invention

Various embodiments of the present invention relate to pre-jam waveforms for enhanced optical break lock jamming effects.

In various examples, pre-jam waveforms for enhanced optical break lock jamming effects may be implemented in the context of systems, methods, computer program products and/or algorithms.

2. Description of Related Art

Infrared (IR) guided surface-to-air missiles typically work by detecting emitted IR radiation from a target. IR energy is collected by a spinning gyroscopic telescope and is modulated by a complex reticle. This modulated energy is collected by an IR sensitive detector and used to generate a time-varying electrical signal. This signal has features (e.g., amplitude and/or frequency) which are proportional to the pointing error angle between the gyroscopic telescope and the target in question.

The detected signal is typically processed through two electrical control loops. The first loop is commonly referred to as the "track" loop and is used to maintain the pointing of the gyroscopic telescope. The track loop acts to reduce the measured error angle between the telescope and the target. The second loop is commonly referred to as the "guidance" loop and is used to maintain the pointing of the missile body. The guidance loop acts to steer the missile body to a predicted intercept point based on the perceived target motion.

In the employment of directable IR laser countermeasures, a laser is aimed into the missile's gyroscopic telescope and the laser light is modulated in such a way as to emulate the error signal of the missile. Using a higher laser power and stray-light paths, the laser light is able to generate a more powerful signal than the true error signal associated with the target. This countermeasure signal is used to steer the missile's gyroscopic telescope to a position where the gyroscopic telescope can no longer see the target. A missile which has been commanded to look at a position other than the target is said to be in a condition of optical break lock ("OBL"). OBL is typically the primary defeat mechanism for modern laser jammers and frequencies.

A problem with OBL is that it is typically an insufficient metric to determine the success of an IR engagement. A missile which is not looking at the target may still hit the target given the ballistic path of the missile, especially if countermeasures are deployed late in the engagement and/or no evasive maneuvers are employed by the target. Frequencies in modern jam codes are generally optimized for OBL. Design of a missile is generally such that the missile track loop can respond at rates up to 10 times the guidance loop. Although modern OBL codes typically do generate some motion in the missile guidance loop, this motion is significantly attenuated relative to the motion in the track loop. Frequencies in modern OBL codes are typically selected based on the "spin" frequency of the missile. That is, the frequencies used are selected to match the best guess of the current spin rate of the missile's telescope. This produces straight line motion from the missile head and generates the fastest OBL possible.

FIG. 1 shows a block diagram of a conventional interaction between an IR seeking missile and a countermeasure system installed on a target. As seen in this figure, missile 101 includes seeker head 101A (having therein a spinning gyroscopic telescope). The seeker head 101A detects emitted IR radiation from a target 103 (e.g., an aircraft or the like). Further, countermeasure system 105 includes laser 105A, which sends laser light (not necessarily visible) to the missile's gyroscopic telescope.

SUMMARY OF THE INVENTION

In various examples, pre-jam waveforms for enhanced optical break lock jamming effects may be implemented in the context of systems, methods, computer program products and/or algorithms.

In one embodiment, a computer readable storage medium, tangibly embodying a program of instructions executable by the computer for generating at least one jamming code for at least one IR radiation seeking threat having at least one telescope spin frequency is provided, the program of instructions, when executing, performing the following steps: generating at least one pre-jam code segment based at least in part on at least one pre-jam frequency not matched to the telescope spin frequency of the IR seeking threat; generating at least one optical break lock code segment based at least in part on at least one jammer frequency matched to the telescope spin frequency of the IR seeking threat; and combining the pre-jam code segment and the optical break lock code segment to form a jamming code.

In another embodiment, a method implemented in a computer system for generating at least one jamming code for at least one IR radiation seeking threat having at least one telescope spin frequency is provided, the method comprising the steps of: generating with the computer system at least one pre-jam code segment based at least in part on at least one pre-jam frequency not matched to the telescope spin frequency of the IR seeking threat; generating with the computer system at least one optical break lock code segment based at least in part on at least one jammer frequency matched to the telescope spin frequency of the IR seeking threat; and combining with the computer system the pre-jam code segment and the optical break lock code segment to form a jamming code.

In another embodiment, a computer readable storage medium, tangibly embodying a program of instructions executable by the computer for generating at least one jamming code for a first IR radiation seeking threat having at least a first telescope spin frequency and a second IR radiation seeking threat having at least a second telescope spin frequency is provided, the program of instructions, when executing, performing the following steps: generating at least a first optical break lock code segment based at least in part on at least a first jammer frequency matched to the first telescope spin frequency of the first IR seeking threat; generating at least a second optical break lock code segment based at least in part on at least a second jammer frequency matched to the second telescope spin frequency of the second IR seeking threat; and combining the first optical break lock code segment and the second optical break lock code segment to form a jamming code; wherein the first optical break lock code segment and the second optical break lock code segment are combined such that the first optical break lock code segment serves as a pre-jam code segment for the second IR seeking threat and the second optical break lock code segment serves as a pre-jam code segment for the first IR seeking threat.

In another embodiment, a method implemented in a computer system for generating at least one jamming code for a first IR radiation seeking threat having at least a first telescope spin frequency and a second IR radiation seeking threat having at least a second telescope spin frequency is provided, the method comprising: generating with the computer system at least a first optical break lock code segment based at least in part on at least a first jammer frequency matched to the first telescope spin frequency of the first IR seeking threat; generating with the computer system at least a second optical break lock code segment based at least in part on at least a second jammer frequency matched to the second telescope spin frequency of the second IR seeking threat; and combining with the computer system the first optical break lock code segment and the second optical break lock code segment to form a jamming code; wherein the first optical break lock code segment and the second optical break lock code segment are combined such that the first optical break lock code segment serves as a pre-jam code segment for the second IR seeking threat and the second optical break lock code segment serves as a pre-jam code segment for the first IR seeking threat.

BRIEF DESCRIPTION OF THE DRAWINGS

The drawings are provided for illustrative purpose only and do not necessarily represent practical examples of the present invention to scale. In the figures, the same reference signs are used to denote the same or like parts.

FIG. 6 is a block diagram of a jamming code according to another embodiment of the present invention.

DETAILED DESCRIPTION OF THE INVENTION

Figure 1:
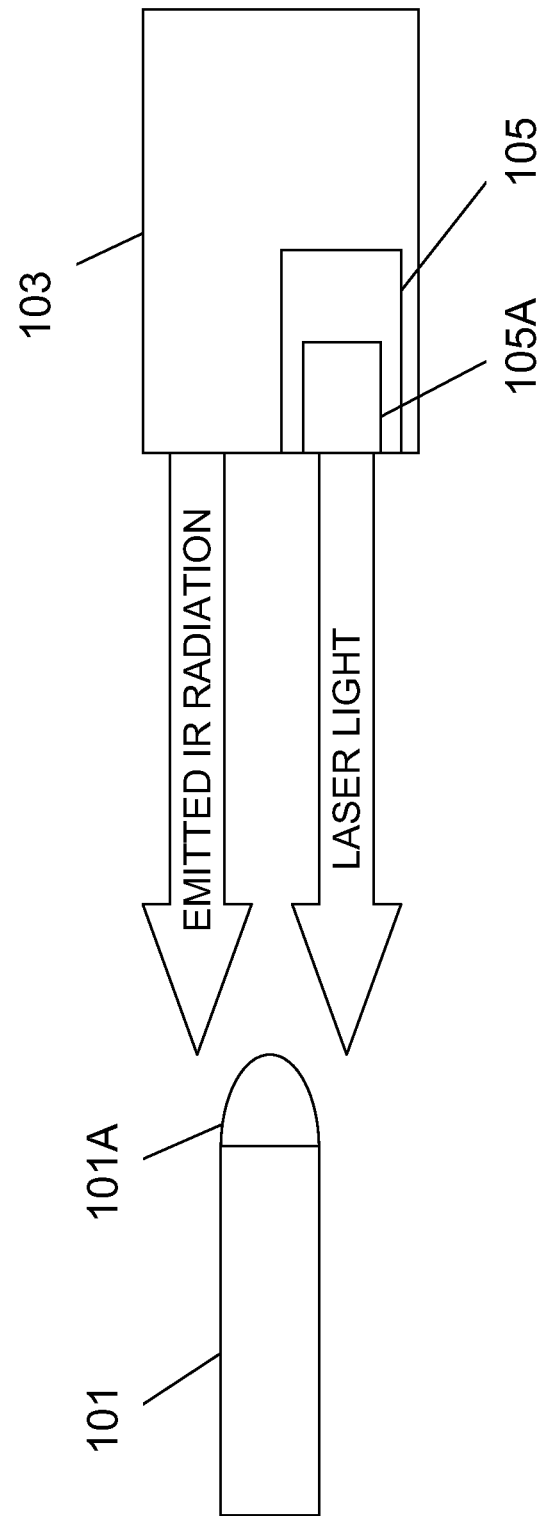
FIG. 1 is a block diagram of a conventional interaction between an IR seeking missile and a countermeasure system installed on a target.

For the purposes of describing and claiming the present invention the term "computer readable storage medium" is intended to refer to a tangible device for storing thereon computer program instructions (or computer programs). Examples include (but are not limited to): magnetic hard drives, optical hard drives, solid state memory devices. The computer program instructions (or computer programs) may be stored on the computer readable storage medium in a non-transitory fashion.

For the purposes of describing and claiming the present invention the term "not matched" (as used in the context of "not matched to the telescope spin frequency of the IR seeking threat") is intended to refer to causing an oscillation in a missile's spinning gyroscopic telescope, wherein the oscillation is generally insufficient to cause optical break lock.

For the purposes of describing and claiming the present invention the term "matched" (as used in the context of "matched to the telescope spin frequency of the IR seeking threat") is intended to refer to causing optical break lock of a missile's spinning gyroscopic telescope.

Frequencies not matched to the missile's gyroscopic telescope spin rate produce an oscillation in the missile's gyroscopic telescope proportional to the difference in frequencies. For example, a jam code at 110 Hz injected into a missile's gyroscopic telescope spinning at 105 Hz produces a 5 Hz oscillation in the missile's gyroscopic telescope. These oscillations are generally poor at inducing OBL, but are also experienced by the guidance loop. The modulated laser light, plus the residual impact of the true target signal, plus the additional modulations imposed by the missile's spinning airframe combine to produce complex chaotic results in the missile flight path. These chaotic flight paths often result with the missile pointed in a direction other than the intercept point. A code segment designed to produce chaotic flight deviations prior to a code segment designed to generate OBL has been shown to be helpful in ensuring the missile misses the target due to a ballistic flight path pointed away from the target at the time of OBL. In this configuration, the code segment designed to induce guidance chaos has been designated a "pre-jam" segment based on its location prior to an OBL jam segment.

Selection of the appropriate pre-jam frequencies may be performed by study of the missile's electronic control loops. A standard missile test called the "dynamic-rate response" is useful to determine the appropriate pre-jam frequency. During a dynamic-rate response a target and jammer are presented to the missile on a static test stand. The jammer frequency is swept and the magnitude of various missile signals is measured.

To accommodate multiple missile types with a single pre-jam segment, a weighted average of a plurality of dynamic-rate responses can produce a single pre-jam frequency with some level of efficacy against multiple missile types.

In general, if the jam code attempts to address multiple missile types with disparate frequencies, an OBL segment for one missile may serve as a non-optimized pre-jam segment for another missile.

Testing had lead to findings which suggested that the inclusion of a "pre-jam" segment within a jam code just prior to the segment intended to achieve optical break lock for a given threat will in fact not only increase the chances of a successful optical break lock, but will also very likely increase the overall miss distance of the threat. This is achieved by causing an increase in body angle error of the targeted threat.

In practice, detection of the missile is typically performed by searching for the tail emitted by the rocket motor. The beam of IR radiation is emitted by the countermeasure system. When the jam code segments are ordered properly a single segment can do double duty as an OBL segment for Missile X and simultaneously a pre-jam segment for Missile Y.

As will be appreciated by one skilled in the art, aspects of the present invention may be embodied as one or more systems, methods, computer program products and/or algorithms.

Figure 2:
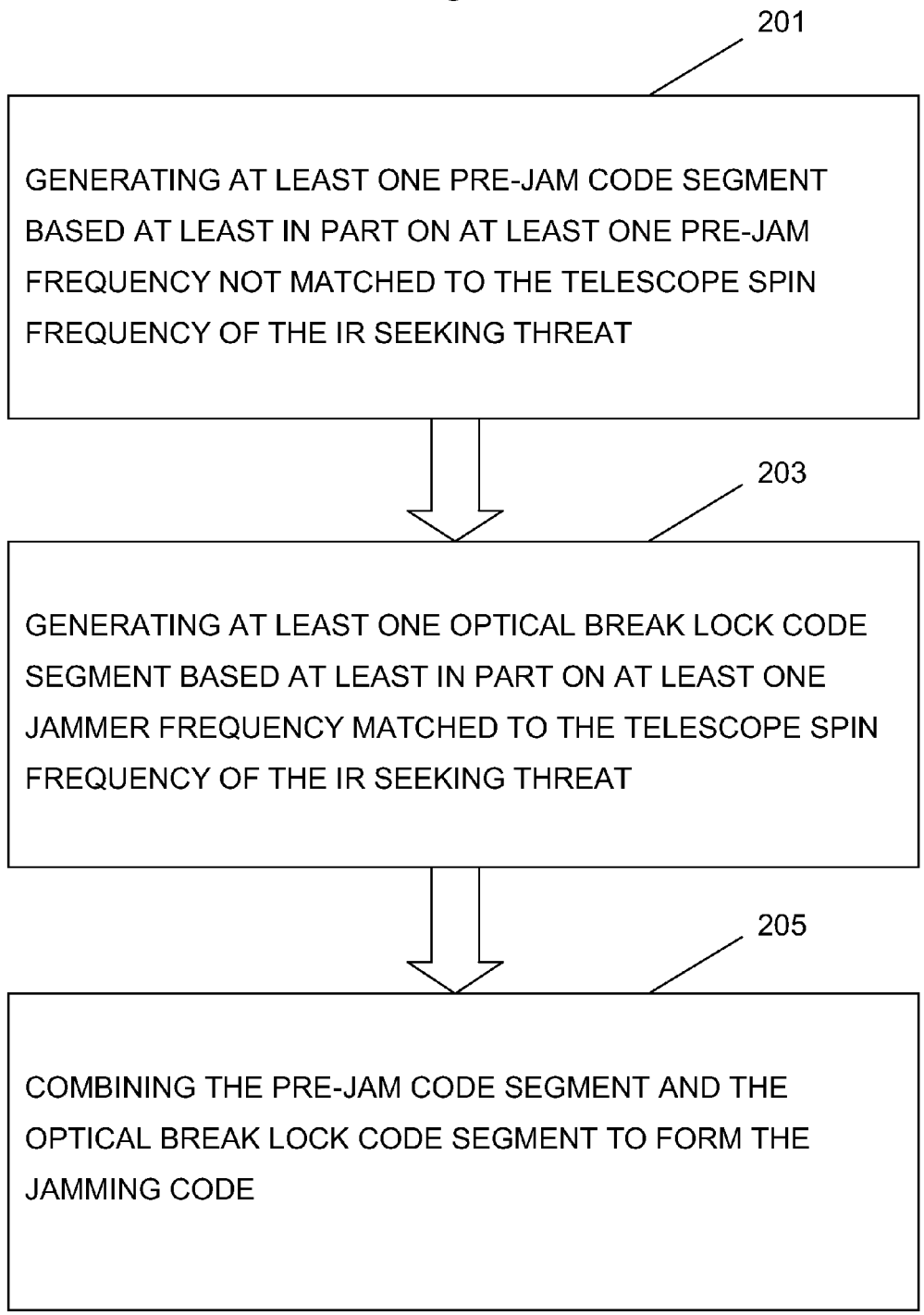
FIG. 2 is a flowchart of a method according to one embodiment of the present invention.

Referring now to FIG. 2, a flowchart of a method according to one embodiment of the present invention is shown. As seen in this figure, Step 201 comprises generating at least one pre-jam code segment based at least in part on at least one pre-jam frequency not matched to the telescope spin frequency of the IR seeking threat.

Further, Step 203 comprises generating at least one optical break lock code segment based at least in part on at least one jammer frequency matched to the telescope spin frequency of the IR seeking threat.

Finally, Step 205 comprises combining the pre-jam code segment and the one optical break lock code segment to form the jamming code.

Figure 3:
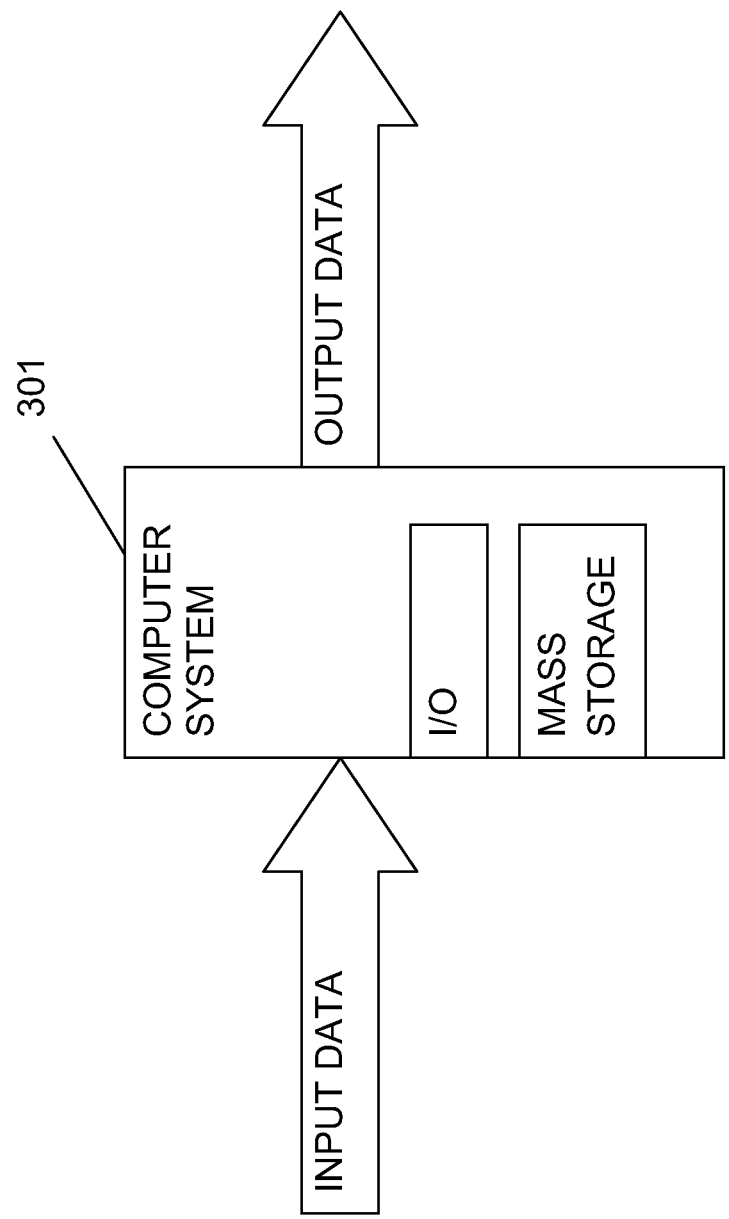
FIG. 3 is a block diagram of a system according to one embodiment of the present invention.

Referring now to FIG. 3, a block diagram of a system according to one embodiment of the present invention is shown. As seen in this figure, computer system 301 includes an I/O subsystem. The I/O subsystem handles data input, data output and network communication. These may be implemented, for example, via keyboard, mouse, video monitor, scanner, optical character recognition, magnetic storage medium, optical storage medium, LAN, WAN and/or the Internet. Computer system 301 also includes a Mass Storage subsystem. The Mass Storage subsystem (which may comprise a computer readable storage medium as defined herein) handles storage of data and/or software programs. The Mass Storage subsystem may be implemented, for example, using one or more magnetic hard drives, one or more optical hard drives and/or one or more solid state memory devices.

Still referring to FIG. 3, it is seen that computer 301 receives input data and provides output data. In one example, the input data may comprise one or more telescope spin frequencies of one or more IR seeking threats, one or more pre-jam frequencies not matched to the telescope spin frequenc(ies) of the IR seeking threat(s), and/or one or more jammer frequencies matched to the spin frequenc(ies) of the IR seeking threat(s). In another example, the output data may comprise at least one pre-jam code segment generated by the computer 301 and at least one optical break lock code segment generated by the computer 301. In another example, the output data may comprise a jamming code generated by the computer 301 (wherein the jamming code of this example is a combination of the generated pre-jam code segment(s) and the generated optical break lock code segment(s)).

Figure 4:
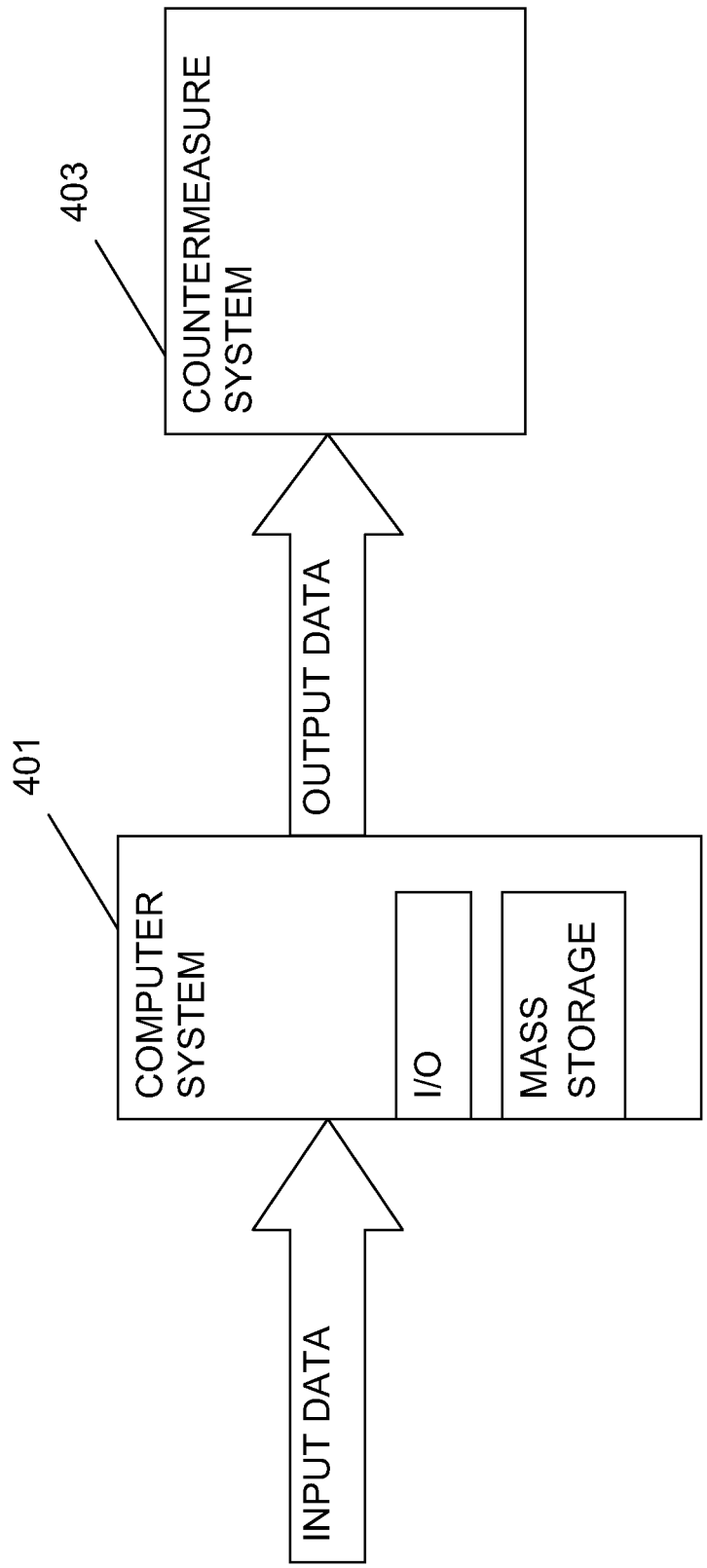
FIG. 4 is a block diagram of a system according to another embodiment of the present invention.

Referring now to FIG. 4, a block diagram of a system according to another embodiment of the present invention is shown. The system of this figure is similar to the system of FIG. 3. The difference here is that in this figure, computer system 401 provides output data to countermeasure system 403. In one example, output data may be provided from computer system 401 to countermeasure system 403 by a hardwired communication channel and/or a wireless communication channel. In another example, output data may be provided from computer system 401 to countermeasure system 403 via portable magnetic memory storage, portable optical memory storage and/or portable solid state memory storage.

In another embodiment, a countermeasure system is provided, comprising: a laser; a storage unit; and a processor in operative communication with the laser and the storage unit; wherein the storage unit includes: (a) at least one jamming code; and (b) program instructions for operating the laser based at least in part on the jamming code. In one example, the jamming code included in the storage unit comprises at least one pre-jam code segment and at least one optical break lock code segment. In another example, the pre-jam code segment may be based at least in part on at least one pre-jam frequency not matched to a telescope spin frequency of an IR seeking threat. In another example, the optical break lock code segment may be based at least in part on at least one jammer frequency matched to a telescope spin frequency of an IR seeking threat.

Figure 5:
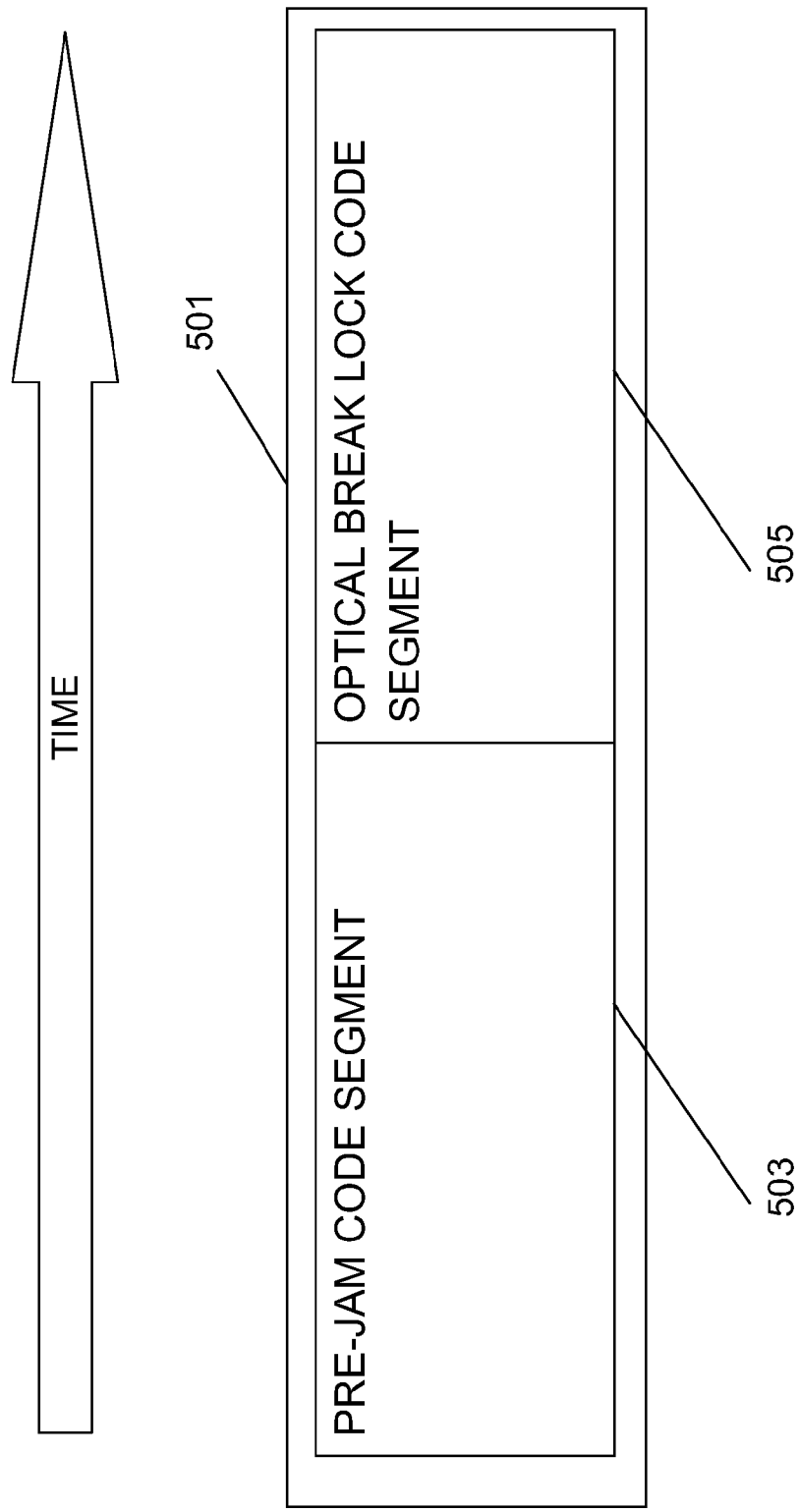
FIG. 5 is a block diagram of a jamming code according to one embodiment of the present invention.

Referring now to FIG. 5, a block diagram of a jamming code according to one embodiment of the present invention is shown. As seen in this figure, this example jamming code 501 includes pre-jam code segment 503 and optical break lock code segment 505. As described herein, the pre-jam code segment 503 may be used to cause an oscillation in a spinning gyroscopic telescope of an IR seeking threat. The subsequent optical break lock code segment 505 may then be used to cause optical break lock in the spinning gyroscopic telescope of the IR seeking threat.

Referring now to FIG. 6, a block diagram of a jamming code according to another embodiment of the present invention is shown. As seen in this figure, this example jamming code 601 includes segment 603A—optical break lock code segment for threat #2. Jamming code 601 also includes segment 603B—optical break lock code segment for threat #2. In this example, segments 603A and 603B are the same (but displaced in time from one another). In addition, jamming code 601 includes segment 605—optical break lock code segment for threat #1.

As described herein, segment 603A may serve as a pre-jam code segment for threat #1 (that is, segment 603A may be used to cause an oscillation in a spinning gyroscopic telescope of threat #1). The subsequent optical break lock code segment 605 may then be used to cause optical break lock in threat #1. In a similar manner, segment 605 may serve as a pre-jam code segment for threat #2 (that is, segment 605 may be used to cause an oscillation in a spinning gyroscopic telescope of threat #2). The subsequent optical break lock code segment 603B may then be used to cause optical break lock in threat #2.

Of course, while FIG. 6 is described with reference to two threats and two corresponding optical break lock code segments, the invention may be applied to any desired number of threats using any desired number of optical break lock code segments in any appropriate temporal order (that is, to provide appropriate pre-jam code segments for any given threat(s) followed by appropriate optical break lock code segments for any given threat(s)).

In one specific example, a plurality of combined or concatenated code segment(s) may be stored as a single jam code in a flight Electronics Control Unit (ECU) of a countermeasure system. In another specific example, a plurality of combined or concatenated code(s) may be stored as a single jam code in an ECU of a countermeasure system.

In another specific example, the code segment(s) and/or code(s) may be designed and generated before the countermeasure system receiving the code segment(s) and/or code(s) is even installed on its receiving platform. In another example, the code segment(s) and/or code(s) may be designed based on the perceived/expected threat(s) that could be encountered. In another example, a countermeasure system may be installed on a potential target (e.g., an aircraft or the like).

In other examples, the length, duration, power and/or frequency of each of the code segment(s) and/or the code(s) may be varied (independently and/or in dependence upon one another) as appropriate.

In other examples, embodiments of the invention may be applied to military use and/or commercial use.

In other examples, any steps described herein may be carried out in any appropriate desired order.

While the present invention has been shown and described with respect to various embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims. In addition, all of the examples disclosed herein are intended to be illustrative, and not restrictive.

What is claimed is:

1. A computer readable storage medium, tangibly embodying a program of instructions executable by the computer for generating at least one jamming code for at least one IR radiation seeking threat having at least one telescope spin frequency, the program of instructions, when executing, performing the following steps:
   generating at least one pre-jam code segment based at least in part on at least one pre-jam frequency not matched to the telescope spin frequency of the IR seeking threat, wherein the pre-jam code segment is configured to cause an oscillation in a guidance loop of the IR seeking threat but not to cause optical break lock in the IR seeking threat;
   generating at least one optical break lock code segment based at least in part on at least one jammer frequency matched to the telescope spin frequency of the IR seeking threat, wherein the optical break lock code segment is configured to cause optical break lock in the IR seeking threat; and
   combining the pre-jam code segment and the optical break lock code segment to form a jamming code, wherein the pre-jam code segment occurs in the jamming code at a time before the optical break lock code segment occurs in the jamming code such that an oscillation would be caused in the guidance loop of the IR seeking threat prior to the optical break lock being caused in the IR seeking threat.

2. The computer readable storage medium of claim 1, wherein the pre-jam code segment is based at least in part on at least one pre-jam frequency that maximizes oscillation of the telescope.

3. The computer readable storage medium of claim 1, wherein the pre-jam code segment is based at least in part on a plurality of pre-jam frequencies that cause oscillation of the telescope.

4. The computer readable storage medium of claim 1, wherein the generating at least one optical break lock code segment based at least in part on at least one jammer frequency matched to the telescope spin frequency of the IR seeking threat comprises generating the optical break lock code segment based at least in part on a plurality of jammer frequencies matched to a plurality of telescope spin frequencies of the IR seeking threat.

5. The computer readable storage medium of claim 1, wherein the jamming code is for jamming a plurality of IR radiation seeking threats, each of which has associated therewith a distinct telescope spin frequency.

6. The computer readable storage medium of claim 1, wherein the program of instructions, when executing, further performs the following step:
   selecting the pre-jam frequency not matched to the telescope spin frequency of the IR seeking threat based at least in part on an analysis of at least one control loop used by the IR seeking threat.

7. The computer readable storage medium of claim 6, wherein the control loop analysis is performed using a dynamic-rate response test.

8. The computer readable storage medium of claim 7, wherein the program of instructions, when executing, further performs the following steps:
   determining a weighted average of a plurality of dynamic-rate responses, wherein each of the plurality of dynamic-rate responses corresponds to one of a plurality of IR seeking threats;
   determining a single pre-jam frequency based on the weighted average of the dynamic-rate responses; and
   generating the pre-jam code segment based at least in part on the determined single pre-jam frequency.

9. The computer readable storage medium of claim 1, wherein the program of instructions, when executing, further performs the following step:
   configuring a countermeasure system to use the jamming code for jamming the IR radiation seeking threat.

10. The computer readable storage medium of claim 9, wherein the configuring the countermeasure system includes storing the jamming code in a storage unit of the countermeasure system.

11. The computer readable storage medium of claim 9, wherein the countermeasure system is installed in an aircraft.

12. The computer readable storage medium of claim 1, wherein the combining the pre-jam code segment and the optical break lock code segment comprises concatenating the pre-jam code segment and the optical break lock code segment.

13. A method implemented in a computer system for generating at least one jamming code for at least one IR radiation seeking threat having at least one telescope spin frequency, the method comprising the steps of:
   generating with the computer system at least one pre-jam code segment based at least in part on at least one pre-jam frequency not matched to the telescope spin frequency of the IR seeking threat, wherein the pre-jam code segment is configured to cause an oscillation in a guidance loop of the IR seeking threat but not to cause optical break lock in the IR seeking threat;
   generating with the computer system at least one optical break lock code segment based at least in part on at least one jammer frequency matched to the telescope spin frequency of the IR seeking threat, wherein the optical break lock code segment is configured to cause optical break lock in the IR seeking threat; and
   combining with the computer system the pre-jam code segment and the optical break lock code segment to form a jamming code, wherein the pre-jam code segment occurs in the jamming code at a time before the optical break lock code segment occurs in the jamming code such that an oscillation would be caused in the guidance loop of the IR seeking threat prior to the optical break lock being caused in the IR seeking threat.

14. The method of claim 13, wherein the pre-jam code segment is based at least in part on at least one pre-jam frequency that maximizes oscillation of the telescope.

15. The method of claim 13, wherein the pre-jam code segment is based at least in part on a plurality of pre-jam frequencies that cause oscillation of the telescope.

16. The method of claim 13, wherein the generating at least one optical break lock code segment based at least in part on at least one jammer frequency matched to the telescope spin frequency of the IR seeking threat comprises generating the optical break lock code segment based at least in part on a plurality of jammer frequencies matched to a plurality of telescope spin frequencies of the IR seeking threat.

17. The method of claim 13, wherein the jamming code is for jamming a plurality of IR radiation seeking threats, each of which has associated therewith a distinct telescope spin frequency.

18. The method of claim 13, further comprising selecting the pre-jam frequency not matched to the telescope spin frequency of the IR seeking threat based at least in part on an analysis of at least one control loop used by the IR seeking threat.

19. The method of claim 18, wherein the control loop analysis is performed using a dynamic-rate response test.

20. The method of claim 19, further comprising:
determining with the computer system a weighted average of a plurality of dynamic-rate responses, wherein each of the plurality of dynamic-rate responses corresponds to one of a plurality of IR seeking threats;
determining with the computer system a single pre-jam frequency based on the weighted average of the dynamic-rate responses; and
generating with the computer system the pre-jam code segment based at least in part on the determined single pre-jam frequency.

21. The method of claim 13, further comprising configuring, with the computer system, a countermeasure system to use the jamming code for jamming the IR radiation seeking threat.

22. The method of claim 21, wherein the configuring the countermeasure system includes storing the jamming code in a storage unit of the countermeasure system.

23. The method of claim 21, wherein the countermeasure system is installed in an aircraft.

24. The method of claim 13, wherein the combining the pre-jam code segment and the optical break lock code segment comprises concatenating the pre-jam code segment and the optical break lock code segment.

25. A computer readable storage medium, tangibly embodying a program of instructions executable by the computer for generating at least one jamming code for a first IR radiation seeking threat having at least a first telescope spin frequency and a second IR radiation seeking threat having at least a second telescope spin frequency, the program of instructions, when executing, performing the following steps:
generating at least a first optical break lock code segment based at least in part on at least a first jammer frequency matched to the first telescope spin frequency of the first IR seeking threat, wherein the first optical break lock code segment is configured to cause optical break lock in the first IR seeking threat;
generating at least a second optical break lock code segment based at least in part on at least a second jammer frequency matched to the second telescope spin frequency of the second IR seeking threat, wherein the second optical break lock code segment is configured to cause optical break lock in the second IR seeking threat; and
combining the first optical break lock code segment and the second optical break lock code segment to form a jamming code;
wherein the first optical break lock code segment and the second optical break lock code segment are combined such that the first optical break lock code segment serves as a pre-jam code segment for the second IR seeking threat and the second optical break lock code segment serves as a pre-jam code segment for the first IR seeking threat;
wherein the pre-jam code segment for the first IR seeking threat is configured to concurrently: (a) cause an oscillation in a guidance loop of the first IR seeking threat but not to cause optical break lock in the first IR seeking threat; and (b) cause optical break lock in the second IR seeking threat;
wherein the pre-jam code segment for the second IR seeking threat is configured to concurrently: (a) cause an oscillation in a guidance loop of the second IR seeking threat but not to cause optical break lock in the second IR seeking threat; and (b) cause optical break lock in the first IR seeking threat.

26. A method implemented in a computer system for generating at least one jamming code for a first IR radiation seeking threat having at least a first telescope spin frequency and a second IR radiation seeking threat having at least a second telescope spin frequency, the method comprising:
generating with the computer system at least a first optical break lock code segment based at least in part on at least a first jammer frequency matched to the first telescope spin frequency of the first IR seeking threat, wherein the first optical break lock code segment is configured to cause optical break lock in the first IR seeking threat;
generating with the computer system at least a second optical break lock code segment based at least in part on at least a second jammer frequency matched to the second telescope spin frequency of the second IR seeking threat, wherein the second optical break lock code segment is configured to cause optical break lock in the second IR seeking threat; and
combining with the computer system the first optical break lock code segment and the second optical break lock code segment to form a jamming code;
wherein the first optical break lock code segment and the second optical break lock code segment are combined such that the first optical break lock code segment serves as a pre-jam code segment for the second IR seeking threat and the second optical break lock code segment serves as a pre-jam code segment for the first IR seeking threat;
wherein the pre-jam code segment for the first IR seeking threat is configured to concurrently: (a) cause an oscillation in a guidance loop of the first IR seeking threat but not to cause optical break lock in the first IR seeking threat; and (b) cause optical break lock in the second IR seeking threat;
wherein the pre-jam code segment for the second IR seeking threat is configured to concurrently: (a) cause an oscillation in a guidance loop of the second IR seeking threat but not to cause optical break lock in the second IR seeking threat; and (b) cause optical break lock in the first IR seeking threat.

* * * * *